United States Patent
Wu et al.

(10) Patent No.: US 9,309,969 B2
(45) Date of Patent: Apr. 12, 2016

(54) SYSTEM AND METHOD FOR CONTROLLING A HYDROSTATIC DRIVE UNIT OF A WORK VEHICLE

(71) Applicant: CNH America, LLC, New Holland, PA (US)

(72) Inventors: Duqiang Wu, Bolingbrook, IL (US); Navneet Gulati, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 8 days.

(21) Appl. No.: 14/162,839

(22) Filed: Jan. 24, 2014

(65) Prior Publication Data
US 2014/0244117 A1    Aug. 28, 2014

Related U.S. Application Data (60) Provisional application No. 61/768,008, filed on Feb. 22, 2013.

(51) Int. Cl.

| | | |
|---|---|---|
| *F16H 61/431* | (2010.01) | |
| *F16H 61/4148* | (2010.01) | |
| *B60W 10/103* | (2012.01) | |
| *B60W 30/02* | (2012.01) | |
| *F16H 59/04* | (2006.01) | |
| *F16H 59/68* | (2006.01) | |

(52) U.S. Cl.
CPC ............ *F16H 61/431* (2013.01); *B60W 10/103* (2013.01); *B60W 30/025* (2013.01); *F16H 59/045* (2013.01); *F16H 61/4148* (2013.01); *F16H 2059/6838* (2013.01)

(58) Field of Classification Search
CPC ................ F16H 61/431; F16H 59/045; F16H 2059/6838; F16H 61/4148; B60W 10/103; B60W 30/025
See application file for complete search history.

(56) References Cited

U.S. PATENT DOCUMENTS

| | | | |
|---|---|---|---|
| 3,938,401 A | | 2/1976 | Bauer |
| 3,968,706 A | | 7/1976 | Bauer |
| 4,229,144 A | | 10/1980 | Kass et al. |
| 4,248,137 A | | 2/1981 | Caruso |
| 4,265,272 A | | 5/1981 | Klimowicz et al. |
| 4,437,385 A | | 3/1984 | Kramer et al. |
| 4,883,091 A | | 11/1989 | Weiler et al. |
| 5,170,625 A | * | 12/1992 | Watanabe et al. ............... 60/452 |
| 5,241,872 A | | 9/1993 | Betz et al. |
| 5,428,958 A | | 7/1995 | Stenlund |

(Continued)

*Primary Examiner* — Rami Khatib
*Assistant Examiner* — Jeffrey Boomer
(74) *Attorney, Agent, or Firm* — Sue C. Watson (57) ABSTRACT

A method for controlling a hydrostatic drive unit of a work vehicle is disclosed. The method may generally include determining a reference swashplate position for a hydraulic pump of the hydrostatic drive unit, wherein the reference swashplate position is associated with an uncompensated current command, and monitoring an actual swashplate position of the hydraulic pump, wherein the actual swashplate position differs from the reference swashplate position due to a loading condition of the work vehicle. In addition, the method may include determining a current compensation based at least in part on the actual and reference swashplate positions and generating a compensated current command by adjusting the uncompensated current command based on the current compensation, wherein the compensated current command is associated with a compensated swashplate position for the hydraulic that differs from the reference swashplate position.

20 Claims, 8 Drawing Sheets

(56) References Cited

U.S. PATENT DOCUMENTS

| | | |
|---|---|---|
| 5,784,945 A | 7/1998 | Krone et al. |
| 5,878,647 A | 3/1999 | Wilke et al. |
| 6,305,419 B1 | 10/2001 | Krieger et al. |
| 7,320,216 B2 | 1/2008 | Ver Kuilen et al. |
| 7,614,336 B2 | 11/2009 | Ver Kuilen et al. |
| 7,621,211 B2 | 11/2009 | Ma et al. |
| 2003/0010026 A1* | 1/2003 | Evans et al. .................. 60/443 |
| 2003/0125859 A1* | 7/2003 | Dix et al. ...................... 701/50 |
| 2007/0078041 A1* | 4/2007 | Nishi et al. .................. 477/115 |
| 2009/0133951 A1* | 5/2009 | Schultz et al. ............... 180/307 |
| 2011/0178684 A1* | 7/2011 | Umemoto et al. ............. 701/51 |
| 2014/0012472 A1* | 1/2014 | Kamada ................ F16H 61/42 701/60 |

* cited by examiner

SYSTEM AND METHOD FOR CONTROLLING A HYDROSTATIC DRIVE UNIT OF A WORK VEHICLE

CROSS-REFERENCE TO RELATED APPLICATIONS

This application is based upon and claims priority to U.S. Provisional Application No. 61/768,008, filed on Feb. 22, 2013, the disclosure of which is hereby incorporated by reference herein in its entirety for all purposes.

FIELD OF THE INVENTION

The present subject matter relates generally to work vehicles and, more particularly, to a system and method for controlling a hydrostatic drive unit of a work vehicle.

BACKGROUND OF THE INVENTION

A common drive unit for work vehicles, such as skid steer loaders, is a hydrostatic drive unit. Hydrostatic drive units are advantageous because they are capable of providing a range of different speeds without the need for mechanical gearing assemblies. Typically, hydrostatic drive units include a hydraulic pump or pumps which are powered by the engine of the work vehicle. The engine may be, for example, a conventional diesel or gasoline engine having a flywheel which turns the pump. Thus, the pump speed and the corresponding fluid flow rate are directly proportional to the engine speed.

In most instances, the hydraulic pump has a displacement chamber for hydraulic fluid. The fluid flow is controlled by the angular position of a swashplate of the pump, which controls the effective length of the displacement chamber. The effective length of the displacement chamber, in turn, regulates the hydraulic fluid flow produced by the pump. As is generally understood, the pump may be fluidly connected to hydraulic devices, such as hydraulic cylinders, for driving various actuators, such as lift arms or ground stabilizers, attached to the work vehicle. In addition, the hydraulic pump may be fluidly connected to a drive motor. The fluid flow from the pump causes the drive motor to rotate the axles, which drive the wheels and, thus, the work vehicle. Typically, a separate motor is provided for the right-side and left-side wheels of a work vehicle, with each motor being fluidly connected to a separate hydraulic pump. As such, the speed of the right-side, and left-side wheels may be independently controlled for improved performance of the work vehicle.

Typically, a hydrostatic drive unit is controlled via a closed-loop or open-loop control system. With closed-loop control systems, the system automatically maintains the displacement of the pump at a fixed swashplate position (that is proportional to the control input provided by the operator) regardless of the loading condition of the work vehicle. As such, closed-loop control systems fail to provide the operator with any operational feedback (e.g., reduced vehicle speed) as loads on the vehicle increase. In contrast, open-loop control systems are load-sensitive and, thus, provide the desired "feeling" of heavy and/or light loads. For example, open-loop control systems are often designed such that, when loads on the vehicle increase, the swashplate automatically de-strokes, thereby providing the operator a tactile indication of the increased loads (i.e., due to the reduction in vehicle speed). However, depending on the operational efficiency of the pump, such de-stroking of the swashplate typically results in a substantial loss in the vehicle's productivity and/or controllability.

Accordingly, a system and method for controlling a hydrostatic drive unit of a work vehicle that provides the desired operational feedback or feeling to the operator while reducing the productivity and/or controllability losses typically experienced with conventional open-loop control systems would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a hydrostatic drive unit of a work vehicle. The method may generally include determining a reference swashplate position for a hydraulic pump of the hydrostatic drive unit, wherein the reference swashplate position is associated with an uncompensated current command, and monitoring an actual swashplate position of the hydraulic pump, wherein the actual swashplate position differs from the reference swashplate position due to a loading condition of the work vehicle. In addition, the method may include determining a current compensation based at least in part on the actual and reference swashplate positions and generating a compensated current command by adjusting the uncompensated current command based on the current compensation, wherein the compensated current command is associated with a compensated swashplate position for the hydraulic that differs from the reference swashplate position.

In another aspect, the present subject matter is directed to a system for controlling a hydrostatic drive unit of a work vehicle. The system may include hydraulic pump, a sensor associated with the hydraulic pump and a valve configured to regulate a pressure of a hydraulic fluid supplied to the hydraulic pump. The sensor may be configured to monitor an actual swashplate position of the hydraulic pump. In addition, the pressure of the hydraulic fluid may be related to the actual swashplate position. The system may also include a controller communicatively coupled to the sensor and the valve. The controller may be configured to both determine a reference swashplate position for the hydraulic pump based on operator inputs and determine a current compensation based at least in part on the actual and reference swashplate positions. The controller may be further configured to generate a compensated current command based on the current compensation. The compensated current command may be associated with a compensated swashplate position for the hydraulic pump that differs from the reference swashplate position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
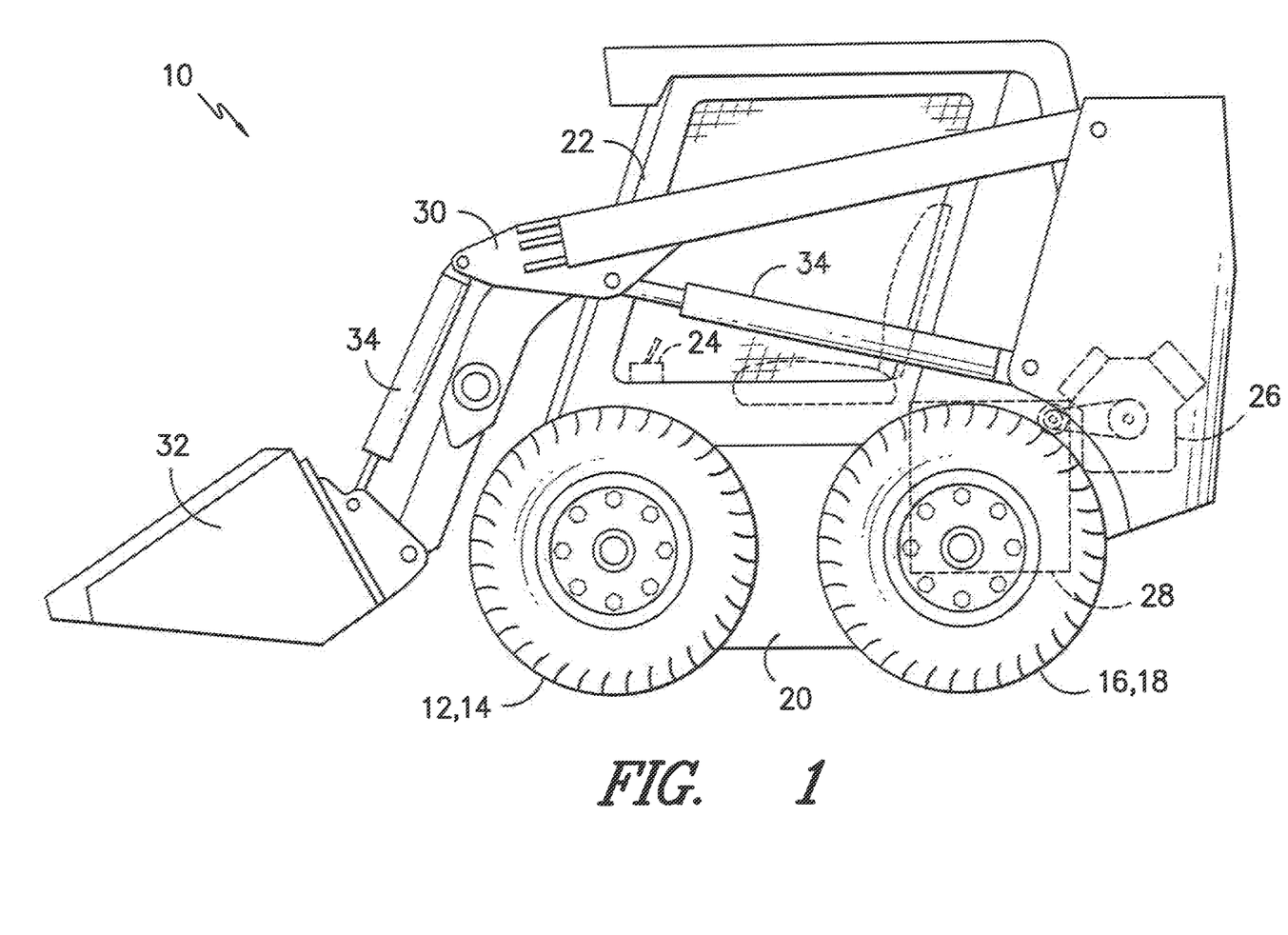
FIG. 1 illustrates a side view of one embodiment of a work vehicle.
Figure 2:
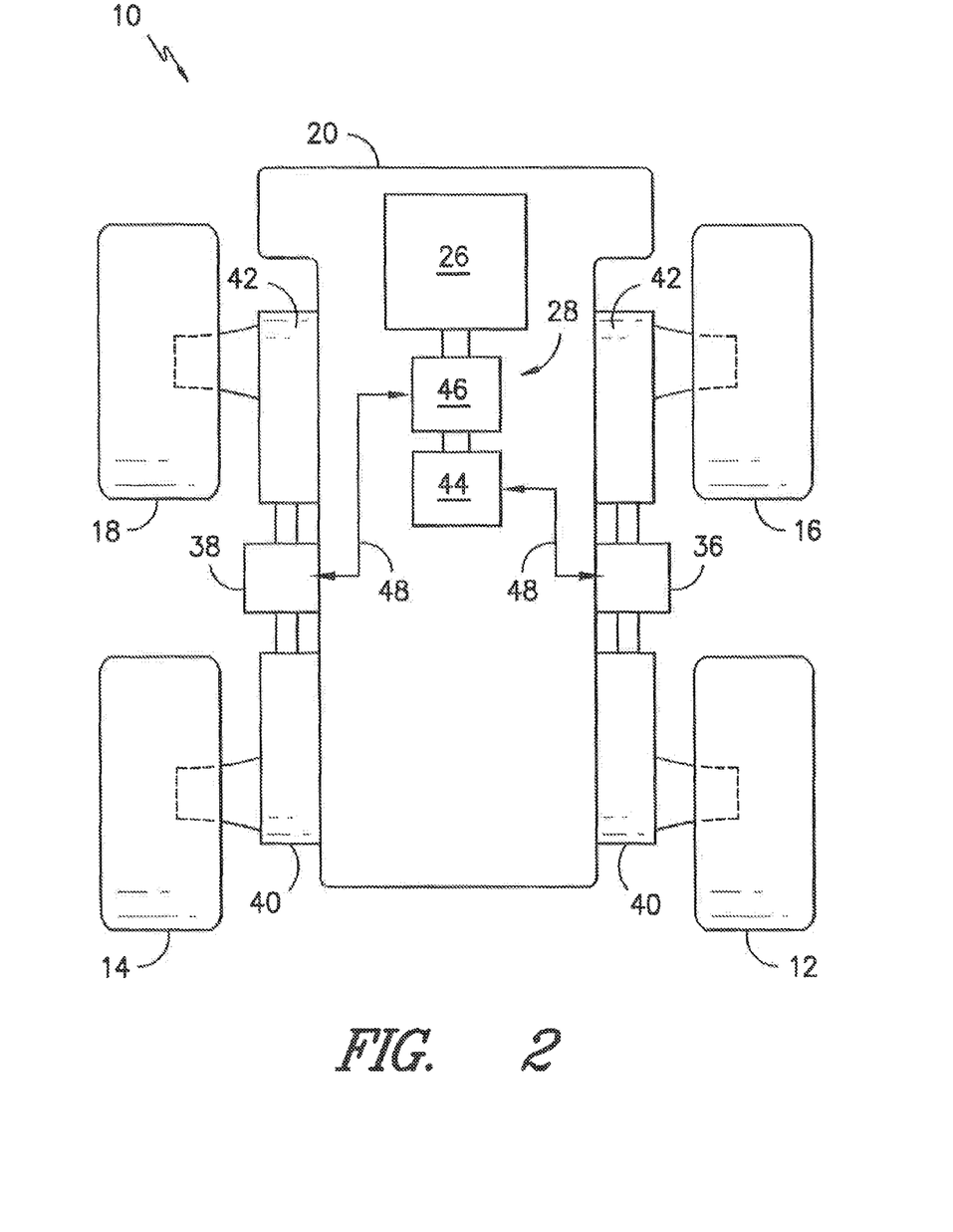
FIG. 2 illustrates a top, schematic view of various components of the work vehicle shown in FIG. 1, including a hydrostatic drive unit of the work vehicle.

Referring now to the drawings, FIGS. 1 and 2 illustrate different views of one embodiment of a work vehicle 10. Specifically, FIG. 1 illustrates a side view of the work vehicle 10 and FIG. 2 illustrates a top, schematic view of various components of the work vehicle 10 shown in FIG. 1. As shown, the work vehicle 10 is configured as a skid steer loader. However, in other embodiments, the work vehicle 10 may be configured as any other suitable work vehicle known in the art, such as various agricultural vehicles, earth-moving vehicles, road vehicles, all-terrain vehicles, off-road vehicles and/or the like.

As shown, the work vehicle 10 includes a pair of front wheels 12, 14, a pair of rear wheels 16, 18 and a chassis 20 coupled to and supported by the wheels 12, 14, 16, 18. An operator's cab 22 may be supported by a portion of the chassis 20 and may house various input devices, such as a joystick 24, for permitting an operator to control the operation of the work vehicle 10. In addition, the work vehicle may include an engine 26 and a hydrostatic drive unit 28 coupled to or otherwise supported by the chassis 20. Moreover, as shown in FIG. 1, the work vehicle may include a pair of loader arms 30 coupled between the chassis 20 and a bucket 32 or other suitable implement. Hydraulic cylinders 34 may also be coupled between the chassis 20 and the loader arms 30 and between the loader arms 30 and the bucket 32 to allow the bucket 30 to be raised/lowered and/or pivoted relative to the loader arms 30.

As particularly shown in FIG. 2, the hydrostatic drive unit 28 of the work vehicle 10 may include a pair of hydraulic motors (e.g., a first hydraulic motor 36 and a second hydraulic motor 38), with each hydraulic motor 36, 38 being configured to drive a pair of wheels 12, 14, 16, 18. For example, the first hydraulic motor 36 may be configured to drive the left-side wheels 12, 16 via front and rear axles 40, 42, respectively. Similarly, the second hydraulic motor 38 may be configured to drive the right-side wheels 14, 18 via front and rear axles 40, 42, respectively. Alternatively, the motors 36, 38 may be configured to drive the wheels 12, 14, 16, 18 using any other suitable means known in the art. For instance, in another embodiment, the motors 36, 38 may be coupled to the wheels 12, 14, 16, 18 via a suitable sprocket/chain arrangement (not shown) as opposed to the axles 40, 42 shown in FIG. 1.

Additionally, the hydrostatic drive unit 28 may include a pair of hydrostatic pumps (e.g., a first hydrostatic pump 44 and a second hydrostatic pump 46) driven by the engine 26, which may, in turn, supply pressurized fluid to the motors. For example, as shown in FIG. 2, the first hydrostatic pump 44 may be fluidly connected to the first motor 36 (e.g., via a suitable hydraulic hose or other fluid coupling 48) while the second hydrostatic pump 46 may be fluidly connected to the second motor 38 (e.g., via a suitable hydraulic hose or other fluid coupling 48). As such, by individually controlling the operation of each pump 44, 46, the speed of the left-side wheels 12, 16 may be regulated independent of the right-side wheels 14, 18.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Figure 3:
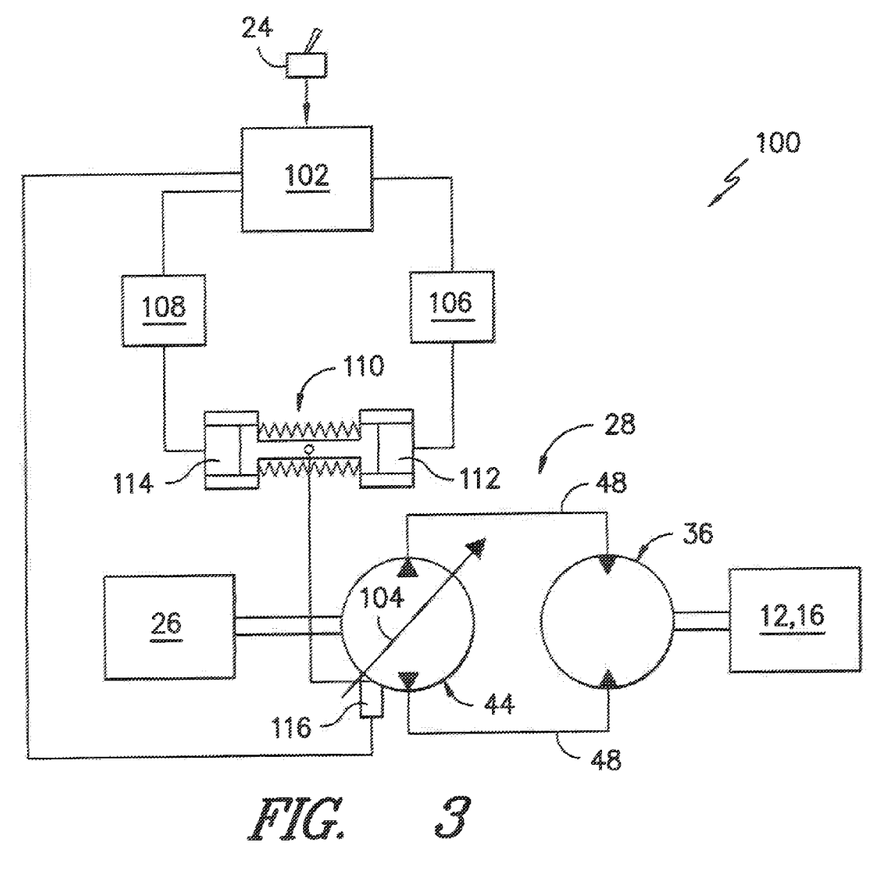
FIG. 3 illustrates a schematic view of one embodiment of a control system for controlling a hydrostatic drive unit of a work vehicle in accordance with aspects of the present subject matter.

Referring now to FIG. 3, a control system 100 for controlling various components of a hydrostatic drive unit 28 of a work vehicle 10 is illustrated in accordance with aspects of the present subject matter. As shown, the control system 100 includes a controller 102 configured to electronically control various aspects of the drive unit's operation. In general, the controller 102 may comprise any suitable processor-based device known in the art. Thus, in several embodiments, the controller 102 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 102 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (MID) and/or other suitable memory elements. Such memory device(s) may generally be configured to store suitable computer-readable instructions that, when implemented by the processor(s), configure the controller 102 to perform various computer-implemented functions, such as the control methodologies shown in FIGS. 5 and 6 and/or the method 300 described below with reference to FIG. 8. In addition, the controller 102 may also include various other suitable components, such as a communications circuit or module, one or more input/output channels, a data/control bus and/or the like.

It should be appreciated that the controller 102 may correspond to an existing controller of the work vehicle 10 (e.g., an existing engine and/or drive unit controller) or the controller 102 may correspond to a separate processing device. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

As shown in FIG. 3, the controller 102 may be communicatively coupled to various components for controlling the operation of the hydraulic pumps 44, 46 (and, thus, hydraulic motors 36, 38). Specifically, the controller 102 is shown in the illustrated embodiment as being coupled to suitable components for controlling the operation of the first hydraulic pump 44 and the first hydraulic motor 36, thereby allowing the controller 102 to electronically control the speed of the left-side wheels 12, 16. However, it should be appreciated that the controller 102 may also be communicatively coupled to similar components for controlling the operation of the second hydraulic pump 46 and the second hydraulic motor 38, thereby allowing the controller 102 to electronically control the speed of the right-side wheels 14, 18.

As indicated above, the hydraulic pump 44 may be driven by the engine 26 and may be fluidly connected to the hydraulic motor 36 via suitable fluid couplings 48 (e.g., hydraulic hoses). The hydraulic motor 36 may, in turn, drive the left-side wheels 12, 16 of the vehicle. In several embodiments, the motor 36 may be configured as a fixed displacement motor while the hydraulic pump 44 may be configured as a variable displacement pump. Accordingly, to change the rotational speed of the motor 36 (and, thus, the rotational speed of the wheels 12, 16), the displacement of the hydraulic pump 44 may be varied by adjusting the position or angle of a swashplate (indicated by the arrow 104) of the pump 44, thereby adjusting the flow of hydraulic fluid to the motor 36.

To electronically control the displacement of the swashplate 104, the controller 102 may be commutatively coupled to suitable pressurize regulating valves 106, 108 (PRVs) (e.g., solenoid-activated valves) configured to regulate the pressure of hydraulic fluid supplied to a control piston 110 of the pump 44. Specifically, as shown schematically in FIG. 3, the controller 102 may be coupled to both a forward PRV 106 configured to regulate the pressure of the hydraulic fluid supplied to a forward chamber 112 of the control piston 110 and a reverse PRV 108 configured to regulate the pressure of the hydraulic fluid supplied to a reverse chamber 114 of the control position 110. By pressurizing the forward chamber 112, the swashplate 104 of the pump 44 may be displaced such that hydraulic fluid flows through the fluid loop defined by the hydrostatic drive unit 28 in a manner that causes the motor 36 to drive the wheels 12, 16 in the forward direction. Similarly, by pressurizing the reverse chamber 114, the swashplate 104 may be displaced such that hydraulic fluid flows through the fluid loop in a manner that causes the motor 36 to drive the wheels 12, 16 in the reverse direction.

As is generally understood, the current supplied to the PRVs 106, 108 is directly proportional to the pressure supplied to the chambers 112, 114, the pressure difference of which is, in turn, directly proportional to the displacement of the swashplate 104. Thus, for example, by increasing the current command to the forward PRV 106 by a given amount, the pressure within the forward chamber 112 and, thus, the angle of the swashplate 104 may be increased by a proportional amount(s). As the angle of swashplate 104 is increased, the flow of hydraulic fluid supplied to motor 36 is similarly increased, thereby resulting in an increase in the rotational speed of the wheels 12, 16 in the forward direction. A similar control strategy may be used to increase the rotational speed of the wheels 12, 16 in the reverse direction by increasing the current command supplied to the reverse PRV 108.

In addition, the current command provided by the controller 102 to the PRVs (either PRV 106 or PRV 108 depending on the vehicle's direction of travel) may be directly proportional to the input provided by the operator via a suitable input device. For example, as shown in FIG. 3, in one embodiment, the work vehicle 10 may be provided with a joystick 24 for providing operator inputs associated with the current command to be provided to the PRVs 106, 108. In such an embodiment, the direction that the joystick 24 is moved by the operator (e.g., forward or back) may determine which PRV (e.g., the forward PRV 106 or the reverse PRV 108) is to receive a current command from the controller 102 while the magnitude of the movement of the joystick 24 (e.g., by moving the joystick to a 20%, 50% or 100% joystick position) may determine the magnitude of the current supplied to the PRV 106, 108. For example, as the joystick position is increased in the forward direction, the current supplied to the forward PRV 106 may be correspondingly increased, thereby increasing both the pressure within the forward chamber 112 and the swashplate angle (and, thus, the rotational speed of the motor 36). Accordingly, by providing operator inputs via the joystick 24, the operator may automatically control the speed of the work vehicle 10.

During operation of the work vehicle 10, the swashplate 104 may attempt to de-stroke (i.e., decrease its angular position) to accommodate increasing load conditions on the vehicle 10. For example, when a resistant torque is applied to the motor 36, the motor RPM is reduced, thereby causing an increase in the loop pressure of the hydraulic drive unit 28. The pump 44 responds to such an increase in loop pressure by de-stroking. For example, if the hydraulic pump 44 is operating at a 100% swashplate angle when the loads acting on the vehicle increase, the swashplate 104 may tend to de-stroke to a lower swashplate angle (e.g., a 20% swashplate angle). Typically, in conventional closed-loop systems, an internal mechanism within the pump 44 is utilized to maintain the swashplate 104 at its original position despite the increase in loads. Thus, if the hydraulic pump 44 is operating at a 100% swashplate angle when the loads acting on the vehicle 10 increase, the internal mechanism may be used to increase the pressure within the appropriate chamber 112, 14 of the control piston 110 to ensure that the pump displacement is maintained at the 100% swashplate angle. Accordingly, due to the automatic adjustment of the swashplate angle, the vehicle 10 is maintained at its current speed without requiring any additional input from the operator (e.g., via the joystick 24). As indicated above, such closed-loop control may be undesirable in many instances in which the operator desires to "feel" the increasing loads of the work vehicle 10.

However, in accordance with aspects of the present subject matter, a semi-open-loop control methodology will be disclosed that utilizes indirect load compensation to accurately control the amount that the swashplate 104 de-strokes with increasing loads. As will be described in greater detail below, such a control methodology may allow for the load sensitivity of the pump 44 to be reduced but not completely eliminated. Thus, in contrast to closed-loop systems that are designed to automatically return the swashplate 104 to its initial, pre-load position, the disclosed methodology may allow the operator to actually feel the effect of increasing loads on the vehicle 10.

It should be appreciated that the control system 100 may also include one or more swashplate sensors 116 associated with the pump 44 to allow the controller 102 to monitor the position of the swashplate 104. Specifically, in several embodiments, the swashplate sensor(s) 116 may be configured to measure the current angle of the swashplate 116. The measurements signals generated by the sensor 116 may then be transmitted to the controller 102 for subsequent storage and/or analysis (e.g., for storage within a unit delay 234 (FIG. 6) of the controller 102).

Figure 4:
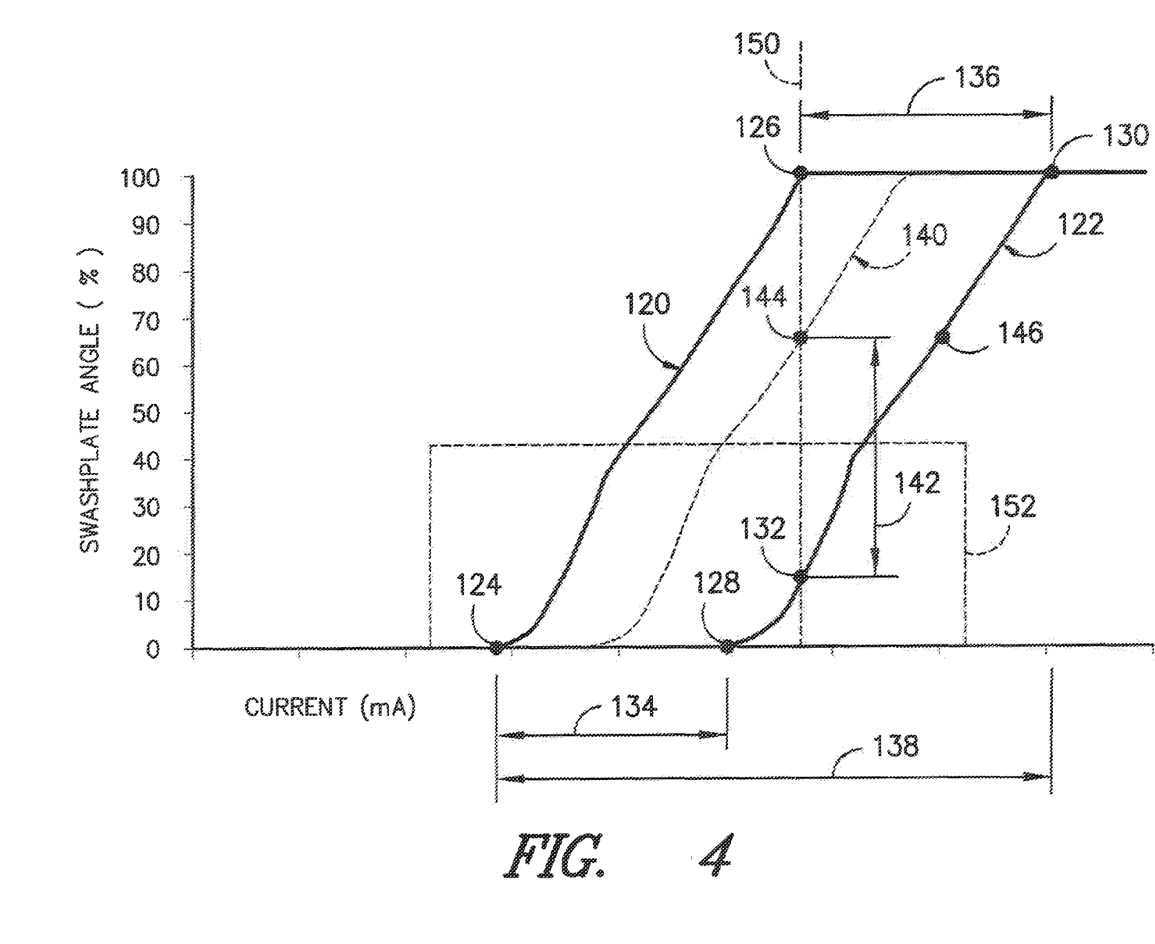
FIG. 4 illustrates a graph providing example operating curves for a hydraulic pump of a hydrostatic drive unit.

Referring now to FIG. 4, a graph depicting the effect of the disclosed control methodology on the amount of de-stroke of the swashplate 104 is illustrated in accordance with aspects of the present subject matter. As shown, the graph illustrates example operating curves (e.g., a minimum load curve 120 and an increased load curve) for a conventional hydraulic pump (e.g., pump 44, 46), with the swashplate angle (in terms of the percentage of the maximum angular position) being charted along the y-axis and the current supplied to the appropriate PRV 106, 108 being charted along the x-axis. The minimum load curve 120 may generally correspond to the operation of the hydraulic pump 44, 46 when the vehicle 10 is operating at minimum load conditions (e.g., when the vehicle 10 is traveling on concrete with no implement loads). Similarly, the increased load curve 122 may correspond to the operation of the hydraulic pump 44, 46 when the loads acting on the vehicle 10 have increased above the minimum loading condition (e.g., when the vehicle 10 is operating in significantly high load conditions, such as when the vehicle 10 is driving through a swamp or when the bucket 32 is being pushed into a rubble pile).

It should be appreciated by those of ordinary skill in the art that a given pump may generally include a plurality of different "increased load curves" corresponding to different hydrostatic loop pressures (i.e., the pressure of the hydraulic fluid supplied between the pump and the motor). For example, the minimum load curve 120 may correspond to the pump's operation when the loop pressure within the hydrostatic drive unit 26 is at a minimum operating pressure. As the loop pressure is increased with increasing vehicle loads, the pump operation may transition from the minimum load curve 120 to one of a plurality of different increased load curves 122. However, to simplify the disclosure provided herein, the operation of the pump 44, 46 is being described only in terms of its minimum load curve 120 and one of its increased load curves 122.

It should also be appreciated that the minimum load curve 120 is being shown as the forward minimum curve for the purpose of describing the present subject matter. However, one of ordinary skill in the art should readily appreciate that a plurality of operating curves may also be defined to the left of the minimum load curve shown in FIG. 4 to illustrate runaway loading conditions in which the loop pressure within the hydrostatic unit 28 is negative (e.g., when the vehicle 10 is going downhill). The present disclosure may also be applied to such runaway loading conditions.

As shown in FIG. 4, when the vehicle 10 is operating at minimum load conditions, the swashplate angle (along with vehicle speed) may begin increasing at a given current input (i.e., at point 124) and may continue to increase along the minimum load curve 120 as the current input is increased until a 100% swashplate angle is reached (i.e., at point 126). Similarly, when the vehicle 10 is operating in increased loading conditions, the swashplate angle (along the with vehicle speed) may begin increasing at a given current input (i.e., at point 128) and may continue to increase along the increase load curve 122 as the current input is increased until a 100% swashplate angle is reached (i.e., at point 130). However, there may be instances in which the vehicle operation quickly changes from the minimum load condition to an increased load condition. For example, it may be assumed that the vehicle 10 is operating at a 100% swashplate angle at the minimum load conditions immediately prior to the vehicle loads increasing (e.g., due to the bucket 32 being pushed into a rubble pile). In a purely open-loop system, since the current command is not automatically adjusted to accommodate for the increase in loads, the swashplate 104 would de-stroke by a significant amount (e.g., from point 126 to point 132), thereby resulting in a large reduction in the vehicle speed. To return the vehicle 10 back to its initial speed, the operator would then have to adjust the joystick position to increase the current command, thereby increasing the swashplate angle along the increased load curve 122 from point 132 to point 130.

In general, such a significant amount of de-stroke is due to the large gap (e.g., gap 134 and gap 136) typically defined between the operating curves for most commercially available hydraulic pumps. As a result, purely open-loop control systems tend to be too sensitive to load changes. Moreover, to accommodate the large current range (e.g., range 138) that is required to operate the vehicle 10 along such operating curves, there is a large saturation zone in the current command, thereby decreasing both the joystick resolution and the overall controllability of the vehicle 10.

Thus, in accordance with aspects of the present subject matter, the disclosed control methodology may be utilized to reduce the effective gaps 134, 136 defined between the minimum and increased load curves 120, 122, thereby reducing the load sensitivity of the pump 44, 46 and increasing the joystick resolution and overall controllability of the vehicle 10. Specifically, in several embodiments, the controller 102 may be configured to apply an indirect load compensation method in which the effective amount of swashplate de-stroke is controlled in order to accommodate increasing loads. For example, a desired operating curve 140 for the hydraulic pump 44, 46 is shown in FIG. 4, which corresponds to the desired pump operation when the vehicle 10 is operating at the increased loading conditions associated with the increased load curve 122. As shown, to operate the pump 44, 46 along the desired operating curve 140, the swashplate displacement must be compensated by a given amount to move the pump's operation between the increased load curve 122 and the desired operating curve 140. For instance, in the example described above in which the vehicle is operating at point 126 on the minimum load curve 120 immediately prior to an increase in the vehicle loading, the swashplate 104 would typically de-stroke to point 132. However, in accordance with aspects of the present subject matter, the swashplate angle may be increased by a specific amount 142 (e.g., the angle % defined between points 132 and 144), thereby ensuring that the swashplate 104 is moved to point 144 on the desired operating curve 140. As will be described below, such compensation of the swashplate angle may be achieved, for example, by adjusting the current command provided by the controller 102 to the appropriate PRV 106, 108.

As shown in FIG. 4, although the effective amount of swashplate de-stroke is reduced by implementing the disclosed control methodology, the desired operating curve 140 is still offset from the minimum load curve 120. As a result, unlike in closed-loop systems, the operator will still notice a slight reduction in the performance of the vehicle 10 when the swashplate angle adjusts to point 144, thereby providing the operator with the desired "feeling" associated with the increased vehicle loads.

Figure 5:
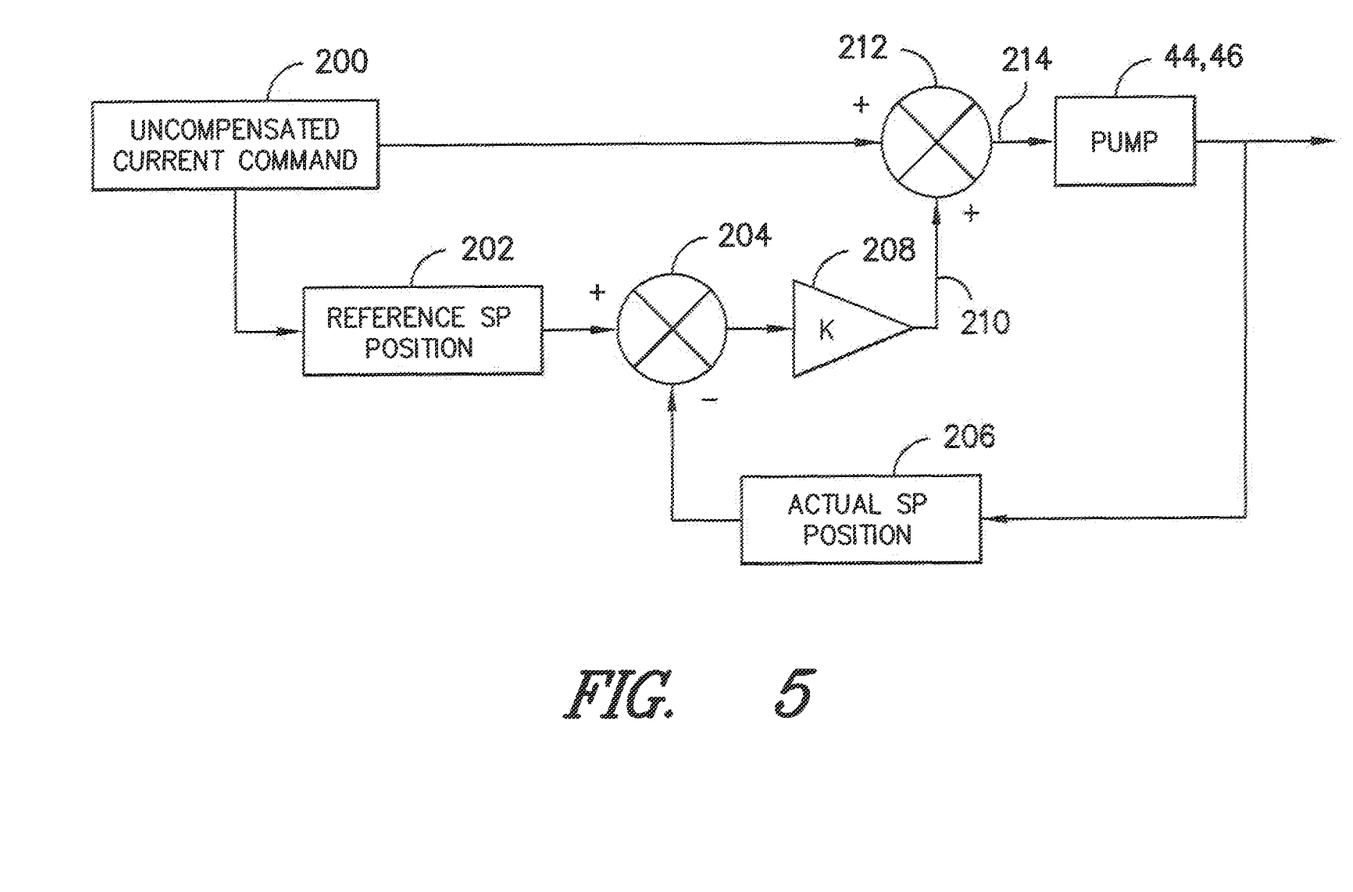
FIG. 5 illustrates a simplified view of one embodiment of a control system diagram for compensating a current command supplied to a hydrostatic drive unit in accordance with aspects of the present subject matter.

Referring now to FIG. 5, a simplified view of one embodiment of a control system diagram for implementing the disclosed control methodology is illustrated in accordance with aspects of the present subject matter. As shown in FIG. 5, at box 200, an uncompensated current command may correspond to the current command to be provided by the controller 102 based on the operator input provided via the joystick 24. As described above, this current command 200 may correlate to a given swashplate angle or position based on the loading condition of the work vehicle 10. Thus, as shown in FIG. 5, in several embodiments, the uncompensated current command 200 may be correlated to a reference swashplate position (box 202) corresponding to the expected swashplate angle for the pump 44, 46 (given the uncompensated current command 200) at the minimum load condition. For instance, referring back to FIG. 4, if the uncompensated current command 200 corresponds to the current associated with line 150, the reference swashplate position may be equal to a 100% swashplate angle (i.e., at point 126). This reference swashplate position may then be input into summing circuit 204.

It should be appreciated that, in several embodiments, the reference swashplate position 202 may be determined by using a look-up table or other suitable data table/correlation stored within the controller's memory. For example, the look-up table may include reference swashplate positions 202 (corresponding to the various swashplate positions shown in FIG. 4 along the minimum load curve 120) for each current command that may be generated by the controller 102. Thus, for each uncompensated current command 200, the look-up table may be utilized to determine the corresponding reference swashplate position 202.

As shown in FIG. 5, at the summing circuit 204, the reference swashplate position 202 may be compared to an actual swashplate position (box 206), which may be determined by the controller 102 using the swashplate angle measurements provided by the swashplate sensor 116 (FIG. 3). Thus, the output of the summing circuit 204 may be the difference between the reference swashplate position 202 and the actual, monitored position 206 of the swashplate 104. During minimal loading conditions (i.e., when the pump 44, 46 is operating along the minimum load curve 120), the reference swashplate position 202 may generally be equal to the actual swashplate position 206. As such, the output of the summing circuit 204 may be equal to zero, in which case the uncompensated current command 200 may remain unadjusted. However, when the vehicle 10 is loaded (e.g., when the pump 44, 46 is operating along the increased load curve 122), the reference swashplate position 202 will differ from the actual swashplate position 204. For example, as indicated above, when the swashplate 104 de-strokes due to increased loading, the actual swashplate position (e.g., at point 132 of FIG. 4) may differ significantly from the reference swashplate position (e.g., at point 126 of FIG. 4). In such instance, a proportional gain (e.g., box 208) may be calculated based on the difference between the reference and actual swashplate positions 202, 206. This proportional gain 208 may then be utilized as a current compensation 210 for adjusting the uncompensated current command 200.

In several embodiments, the proportional gain 208 may generally correspond to the ratio of the difference in the current command required between the desired operating curve 140 and the increased load curve 122 to achieve a given swashplate angle (e.g., the difference between points 144 and 146 in FIG. 4) over the difference in the swashplate position between the minimum load curve 120 and the desired operating curve 140 at the given current command (e.g., the difference between points 126 and 144 in FIG. 4). For example, in one embodiment, due to the non-linearity of the operating curves, the proportional gain 208 may be calculated according to the following equation (Equation 1):

$$k = \frac{1 - \frac{B_r}{B_p}}{G} \quad (1)$$

Wherein, k corresponds to the proportional gain 208 (e.g., with units of milliamps (mA)), $B_r$ corresponds to the desired load sensitivity for the pump 44, 46, such as the swashplate angle per loop pressure variation of the desired operating curve 140 (e.g., with units of $$\frac{\text{angle \%}}{\text{bar}}\bigg),$$

$B_p$ corresponds to me actual load sensitivity for the pump 44, 46, such as the swashplate angle per loop pressure variation of the increased load curve 122 (e.g., with units of $$\frac{\text{angle \%}}{\text{bar}}\bigg)$$

and G corresponds to the average steady state control gain, such as the slope of minimal load curve 120 (e.g., in units of $$\frac{\text{angle \%}}{\text{mA}}\bigg).$$

Upon calculating the proportional gain 208, the gain may be input into summing circuit 212 as the calculated current compensation 210. Specifically, as shown in FIG. 5, the uncompensated current command 200 may be summed with the current compensation 210 to generate a compensated current command 214. As indicated above, when the reference swashplate position 202 is equal to the actual swashplate position 206, the current compensation 210 input into the summing circuit 212 may be zero. Thus, the compensated current command 214 may be equal to the uncompensated current command 200. However, when the reference swashplate position 202 differs from the actual swashplate position 206, the current compensation 210 input into the summing circuit 212 may be a non-zero value (e.g., a positive, non-zero value for increased loading conditions or a negative, non-zero value for runaway loading conditions), thereby generating a compensated current command 214 that differs from the uncompensated current command 200. Regardless, the compensated current command 214 may then be applied to the system to allow for the swashplate position to be automatically increased (e.g., from point 132 to point 144 in FIG. 4) to reduce load sensitivity and increase vehicle controllability while still providing the desired operational feedback the operator.

Figure 6:
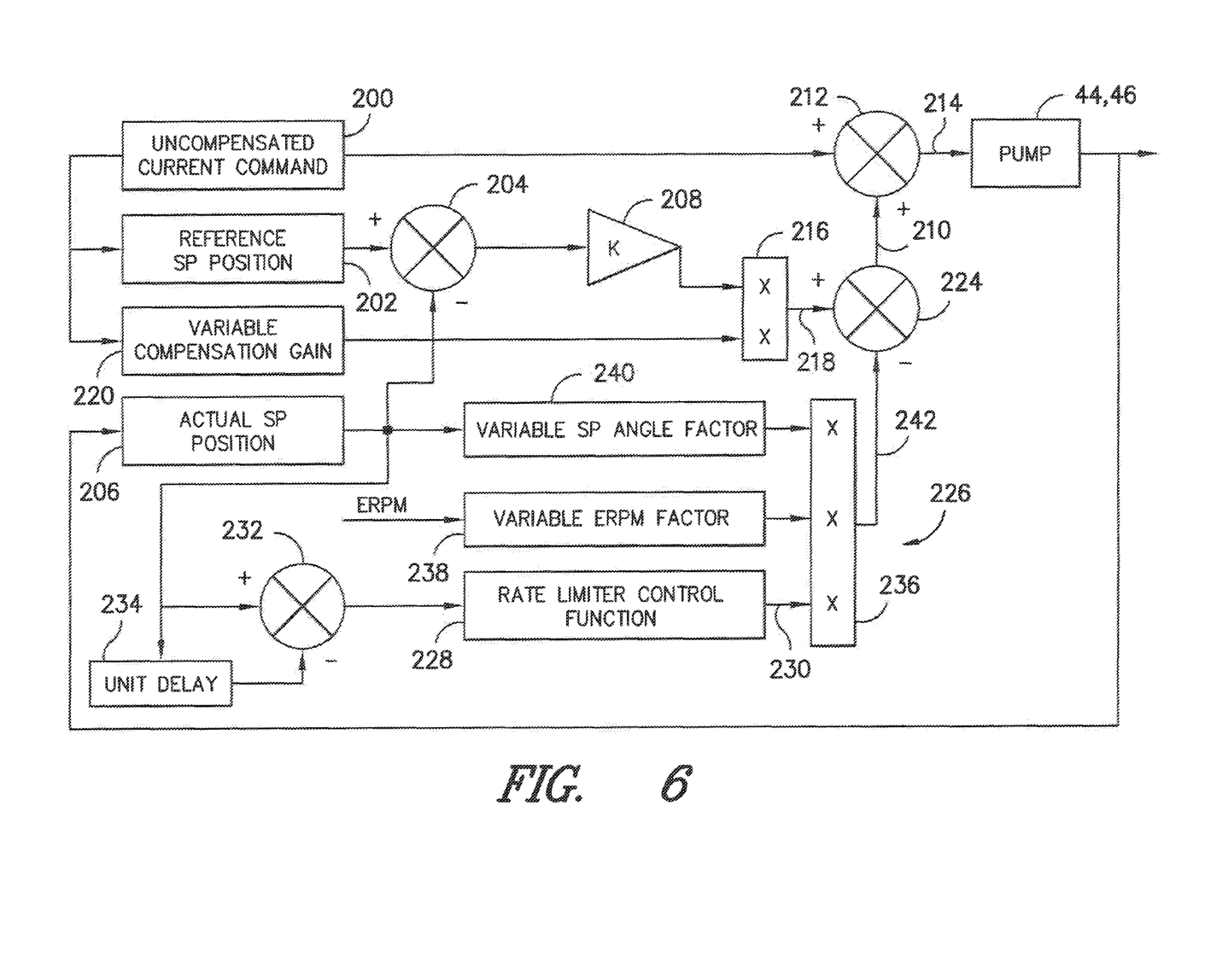
FIG. 6 illustrates a detailed view of one embodiment of a control system diagram for compensating a current command supplied to a hydrostatic drive unit in accordance with aspects of the present subject matter.

Referring now to FIG. 6, a detailed view of one embodiment of a control system diagram for implementing the disclosed control methodology is illustrated in accordance with aspects of the present subject matter. As shown, the control methodology may be implemented similarly to the control methodology described above with reference to FIG. 5. For example, an uncompensated current command 200 associated with the input provided by the operator may be utilized to determine a reference swashplate position 202. This reference swashplate position 202 may then be input into summing circuit 204 and compared to an actual swashplate position 206 determined using the measurement signals provided by the swashplate sensor 116 (FIG. 3). As described above, the output of the summing circuit 204 may then be utilized to calculate a proportional gain 208 based on the difference between the reference and actual swashplate positions 202, 206.

However, as shown in FIG. 6, unlike the embodiment of FIG. 5, the proportional gain 208 may be input into a calculation circuit 216 that outputs a modified proportional gain 218 based on a variable compensation gain 220. The variable compensation gain 220 may generally correspond to a gain modifier or correction factor that is adapted to accommodate the non-linearity of the pump's operating curves. Specifically, hydraulic pumps are typically much more sensitive to current changes at low swashplate angles than at high swashplate angles. For example, as shown in FIG. 3, at lower swashplate angles, the pump's operating curves are typically non-linear and exhibit a relatively high slope (e.g., the portion of the curves shown in the dashed box 152), thereby making the pump displacement extremely sensitive to even small current changers. However, as the swashplate angle is increased (e.g., to angles above the dashed box 152), the operating curves become more linear and the slope decreases, thereby reading the sensitivity of the pump displacement to changes in current.

Figure 7:
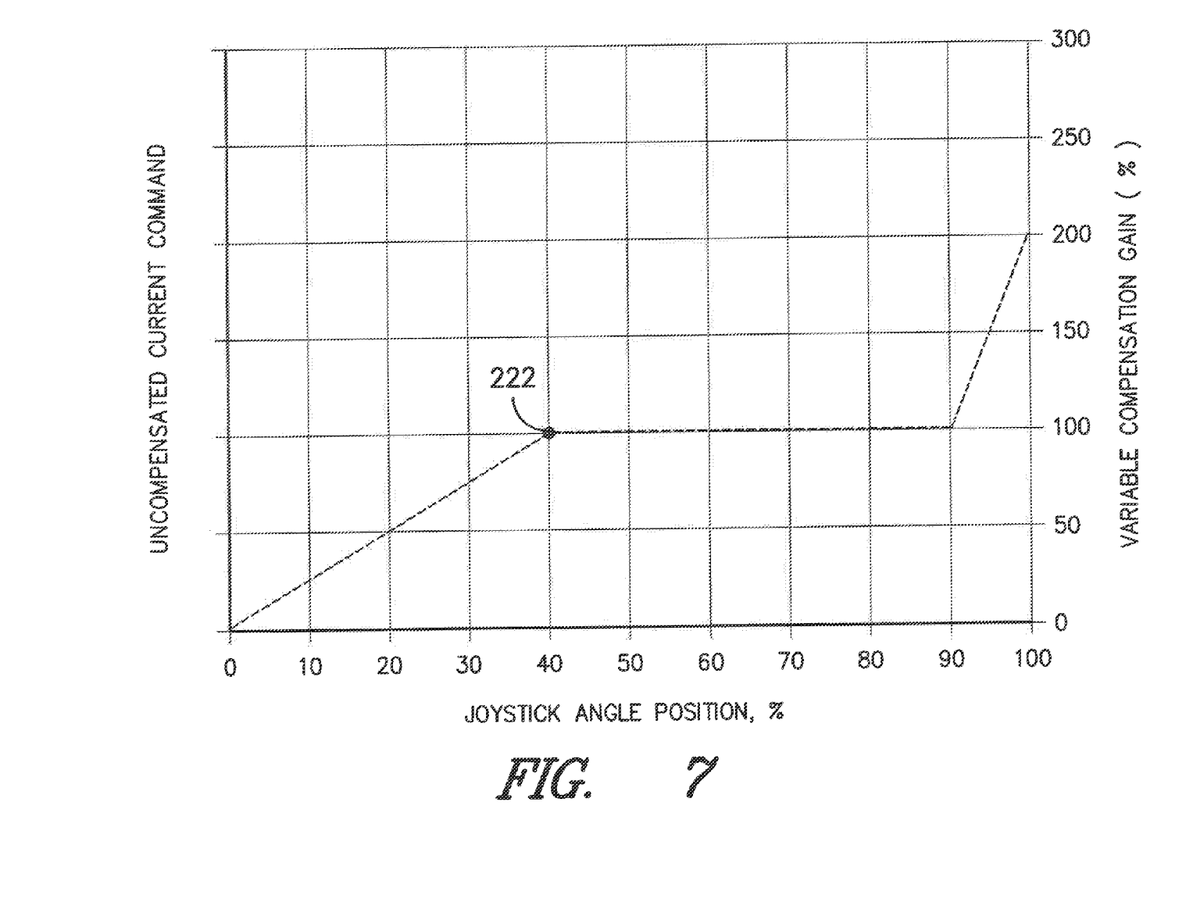
FIG. 7 illustrates a graph providing an example of a variable compensation gain that may be utilized in compensating the current command shown in FIG. 6.

Accordingly, in several embodiments, it may be desirable to select the variable compensation gain 220 such that a smaller current compensation 210 is generated at lower swashplate angles to prevent jerkiness of the vehicle's motion due to the pump's increased sensitivity. However, at higher swashplate angles, the current compensation 210 may be increased to provide increased vehicle responsiveness at higher speeds. For example, FIG. 7 illustrates a graphical representation of one example of a variable compensation gain 220 that may be utilized to modify the proportional gain 208 based on whether the pump is operating at lower or higher swashplate angles. As shown, at lower joystick positions (and, thus, lower current commands) the variable compensation gain may be less than 100%. Thus, the modified proportional gain 218 output from the calculation circuit 216 may be less than the proportional gain 208 input into the circuit 216, thereby allowing the current compensation 210 to be reduced at lower swashplate angles. However, as the joystick position and, thus, the current command is increased above a given threshold (e.g., at point 222), the variable compensation gain 220 may be equal to 100% or more to provide increased vehicle responsiveness. For example, as shown in FIG. 7, the variable compensation gain 220 may be equal to 100% for a given range of joystick positions and then may increase as the swashplate approaches or reaches its full stroke (i.e., its maximum angular position).

It should be appreciated that the threshold point 22 at which the variable compensation gain 220 is increased to 100% may generally correspond to the joystick potion (and/or uncompensated current command) at which the pump's operating curves transition from non-linear, highly sloped curves to a more linear, lower sloped curves. As shown in FIG. 7, for the example pump data being utilized, the threshold was defined at around the 40% joystick position. However, in other embodiments, the threshold may be defined below the 40% joystick position (e.g., at a 30% joystick position) or above the 40% joystick position (e.g., at a 50% joystick position), depending primarily on the particular operative curves for the pump being used for a given application.

It should also be appreciated that, in several embodiments, the variable compensation gain 220 and/or the modified proportional gain 218 may be obtained using look-up tables stored within the controller 102. For example, in one embodiment, a look-up table may be stored within the controller 102 that provides variable compensation gain values for each potential combination of current command (or joystick position) and loading condition of the vehicle 10. Similarly, in another embodiment, a look-up table may be stored within the controller 102 that provides modified proportional gain values for each potential combination of current command (or joystick position) and loading condition of the vehicle 10.

Referring back to FIG. 6, the modified proportional gain 218 may then be input into summing circuit 224 that also receives an input from a rate limiter circuit 226 designed to limit that rate which the pump displacement is varied. Specifically, as shown in FIG. 7, the output from the rate limiter circuit 226 may be subtracted from modified proportional gain 218 at the summing circuit 225 to allow the resulting current compensation 210 to be reduced in instances in which it is desirable to limit the rate of change of the swashplate position to prevent jerky or rough operation of the vehicle 10.

In general, the rate limiter circuit 226 may include a rate limiter control function 228 that is configured to determine a suitable rate limit compensation 230 based on a comparison of the current (actual) swashplate position 206 and one or more previous swashplate positions. For example, as shown in FIG. 7, the actual swashplate position measurement provided by the swashplate sensor 116 may be input into summing circuit 232 together with the previous swashplate position measurement provided by a unit delay 234 or any other suitable memory element capable of storing the previous position measurement. The output of the summing circuit 232 (i.e., the difference between the current and previous swashplate position measurements) may then be input into the control function 228 to determine a suitable rate limit compensation 230. This rate limit compensation 230 may then be input into a calculation circuit 236 that receives additional correction factors 238, 240 that may be used to modify the rate limit compensation 230 generated by the control function 228. For example, it may be desirable for the change in vehicle speed to be proportional to the swashplate angle position. For instance, a reciprocal relationship may exist in which the strength or magnitude of the rate limit applied may be large for low swashplate angles and small for higher swashplate angles. In such an embodiment, the correction factors 238, 240 may be selected such that the displacement rate of the pump is significantly limited at low vehicle speeds to achieve smooth, precise control of the vehicle and less limited at high vehicle speeds to provide the desired vehicle responsiveness. For example, as shown in FIG. 6, the correction factors 238, 240 may be based on the engine RPM (box 238) and the swashplate position (box 240) to allow the rate limit compensation to be appropriately modified for low vehicle speeds (e.g., at lower ERPM values and lower swashplate positions) and high vehicle speeds (e.g., at higher ERPM values and higher swashplate positions).

The modified rate limit compensation 242 output from the calculation circuit 236 may then be input into the summing circuit 224 and subtracted from the modified proportional gain 218. The resulting output (i.e., the calculated current compensation 210) may then be input into summing circuit 212 together with the uncompensated current command 200 to generate a compensated current command 214, may then be transmitted to the appropriate PRV 106, 108 to adjust the chamber pressure within the control position 110 and, thus, appropriately modify the swashplate position to provide the desired pump operation based on the current loading condition of the vehicle 10 (e.g., as described above with reference to FIG. 4).

Figure 8:
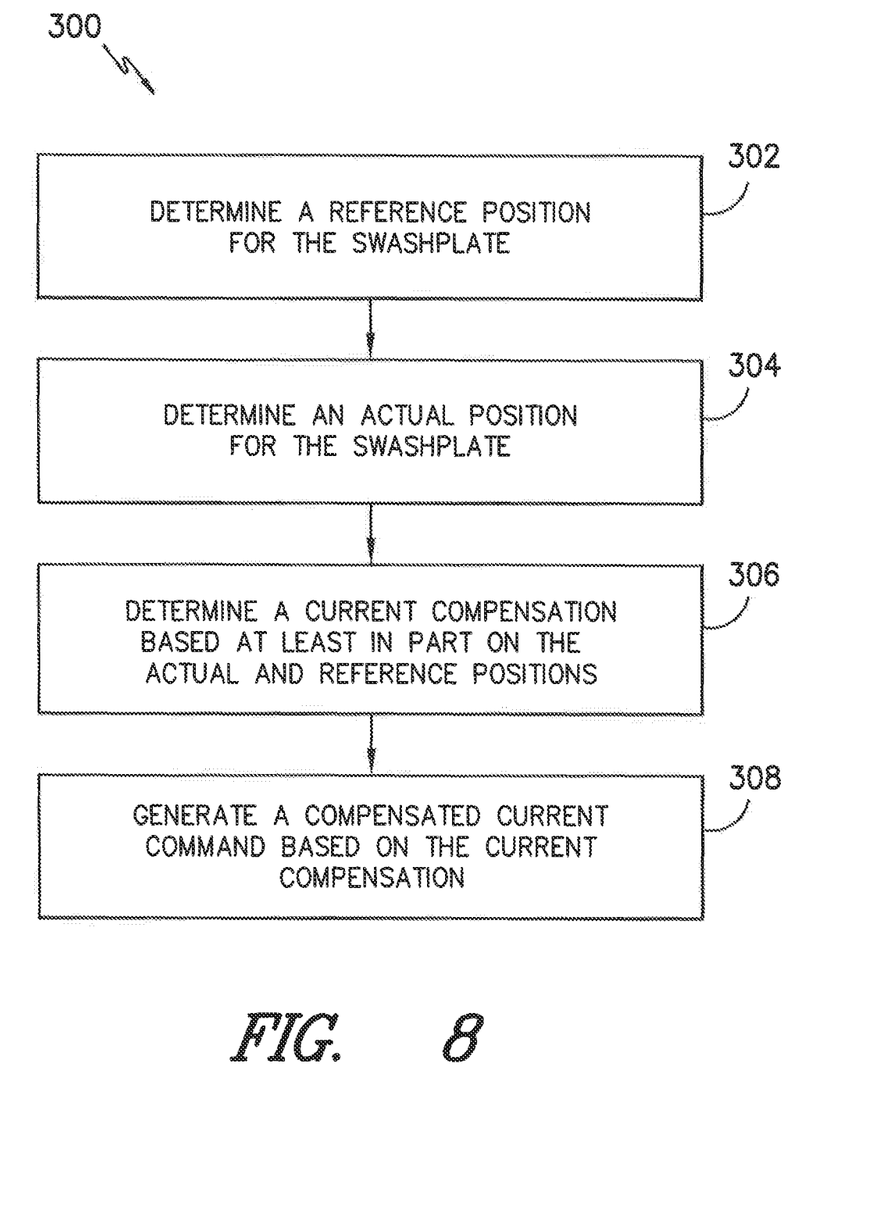
FIG. 8 illustrates a flow diagram of one embodiment of a method for controlling a hydrostatic drive unit of a work vehicle in accordance with aspects of the present subject matter

Referring now to FIG. 8, a flow diagram of a specific embodiment of a method 300 for controlling a hydrostatic drive unit 28 of a work vehicle 10 is illustrated in accordance with aspects of the present subject matter. In general, the disclosed method 300 may incorporate any combination of the various control features described above (particularly with reference to FIGS. 5 and 6) that allow for the amount of swashplate de-stroke to be controlled based on the current loading condition of the work vehicle 10. Specifically, when the loads acting on the vehicle 10 increase, the pump operation to may be controlled hi a manner that reduces the effective de-stroke of the swashplate 104, thereby reducing the load sensitivity of the pump 44, 46 and increasing the overall controllability and performance of the vehicle 10. However, since the swashplate de-stroke is only reduced and not completely eliminated, the pump 44, 46 may still have sufficient load sensitivity so as to provide the operator with the desired feedback or feel associated with the increasing loads.

As shown in FIG. 8, at 302 and 304, both a reference position and an actual portion for the swashplate 104 may be determined by the controller 102. As indicated above with reference to FIG. 5, the reference swashplate position 202 may, for example, correspond to the swashplate position that is expected to result when the uncompensated current command (i.e., the current command generated as a function of the joystick position) is applied for a pump operating along its minimum load curve 120 (e.g., at a minimum load condition for the vehicle 10). Similarly, the actual swashplate position may be determined based on the measurement signals received from the swashplate sensor 116.

Additionally, at 306, a current compensation may be determined based, at least in part, on the difference between the actual and reference swashplate positions. For example, as described above with reference to FIG. 5, a proportional gain 208 may be calculated based on the actual and reference swashplate positions 202, 206, which may then be utilized as the current compensation 210 for modifying the uncompensated current command 200 (e.g., at summing circuit 212). Alternatively, as described above with reference to FIG. 6, the proportional gain 208 may be modified based on a variable compensation gain 220 (e.g., at calculation circuit 216) and/or based on a rate limit compensation for the swashplate position (e.g., at summing circuit 224) to determine the current compensation 210.

Referring still to FIG. 8, at 308, a compensated current command may be generated by adjusting the uncompensated current command based on the current compensation determined at 306. This compensated current command may then be applied to the system such that the swashplate is moved to a compensated position (or angle) that differs from both the reference and actual positions. For example, as shown in FIG. 4, the compensated position (e.g., at point 144) may be less than the reference position (e.g., at point 126) and greater than the actual position (e.g., at point 132). As such, the effective de-stroke of the swashplate 104 may be reduced significantly, thereby reducing the load sensitivity of the pump 44, 46 and increasing the overall controllability and performance of the vehicle 10. However, since the compensated position is still less than the reference position, the load sensitivity of the pump 44, 46 may be sufficient to provide adequate feedback to the operator so as to indicate an increase in vehicle loading.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a hydrostatic drive unit of a work vehicle, the method comprising:
   determining a reference swashplate position for a swashplate of a hydraulic pump of the hydrostatic drive unit, the reference swashplate position being associated with an unadjusted valve current command;
   monitoring an actual swashplate position of the swashplate, the actual swashplate position differing from the reference swashplate position due to a loading condition of the work vehicle;
   determining a valve current adjustment based at least in part on the actual and reference swashplate positions;
   generating an adjusted valve current command by modifying the unadjusted valve current command based on the valve current adjustment, the adjusted valve current command being associated with moving the swashplate to an adjusted swashplate position that is defined between the reference swashplate position and the actual swashplate position; and
   controlling a valve of the work vehicle based on the adjusted valve current command such that the swashplate is moved to the adjusted swashplate position,
   wherein, at the adjusted swashplate position, the hydrostatic drive unit drives the work vehicle at a vehicle speed that is less than a vehicle speed associated with the reference swashplate position.

2. The method of claim 1, wherein the adjusted swashplate position is less than the reference swashplate position and greater than the actual swashplate position.

3. The method of claim 1, further comprising receiving an operator input associated with the unadjusted current command.

4. The method of claim 1, wherein monitoring an actual swashplate position of the swashplate comprises receiving a signal related to the actual swashplate position from a swashplate sensor associated with the hydraulic pump.

5. The method of claim 1, wherein determining a valve current adjustment based at least one of the actual and reference swashplate positions comprises calculating a proportional gain based on the difference between the actual and reference swashplate positions.

6. The method of claim 5, wherein the proportional gain is calculated according to the following equation:

$$k = \frac{1 - \frac{B_r}{B_p}}{G}$$

wherein, k corresponds to the proportional gain, $B_r$ corresponds to a desired load sensitivity for the hydraulic pump, $B_p$ corresponds to an actual load sensitivity for the hydraulic pump and G corresponds to a steady state control gain for the hydraulic pump.

7. The method of claim 5, further comprising modifying the proportional gain based on a variable compensation gain to generate a modified proportional gain, the variable compensation gain changing based on variations in the actual swashplate position.

8. The method of claim 7, wherein the variable compensation gain increases as the actual swashplate position increases.

9. The method of claim 1, further comprising modifying the adjusted valve current command by a rate limit compensation associated with a desired rate of change for the actual swashplate position.

10. The method of claim 9, wherein the rate limit compensation is determined based at least in part on the actual swashplate position, a previous swashplate position and at least one correction factor.

11. A system for controlling a hydrostatic drive unit of a work vehicle, the system comprising:
a hydraulic pump including a swashplate;
a sensor associated with the hydraulic pump, the sensor being configured to monitor an actual swashplate position of the swashplate;
a valve configured to regulate a pressure of a hydraulic fluid supplied to the hydraulic pump, the pressure of the hydraulic fluid being related to the actual swashplate position; and
a controller communicatively coupled to the sensor and the valve, the controller being configured to both determine a reference swashplate position for the swashplate based on operator inputs and determine a valve current adjustment based at least in part on the actual and reference swashplate positions, the controller being further configured to generate an adjusted valve current command for the valve based on the current compensation, the adjusted valve current command being associated with moving the swashplate to an adjusted swashplate position that is defined between the reference swashplate position and the actual swashplate position, the controller being configured to control the valve based on the adjusted current command such that the swashplate is moved to the adjusted swashplate position,
wherein, at the adjusted swashplate position, the hydrostatic drive unit drives the work vehicle at a vehicle speed that is less than a vehicle speed associated with the reference swashplate position.

12. The system of claim 11, further comprising an input device communicatively coupled to the controller, the input device being configured to provide operator inputs associated with an unadjusted valve current command.

13. The system of claim 12, wherein the controller is configured to generate the adjusted valve current command by modifying the unadjusted valve current command based on the valve current adjustment.

14. The system of claim 11, wherein the adjusted swashplate position is less than the reference swashplate position and greater than the actual swashplate position.

15. The system of claim 11, wherein the controller is configured to calculate a proportional gain based on the difference between the actual and reference swashplate positions.

16. The system of claim 15, wherein the proportional gain is calculated according to the following equation:

$$k = \frac{1 - \frac{B_r}{B_p}}{G}$$

wherein, k corresponds to the proportional gain, $B_r$ corresponds to a desired load sensitivity for the hydraulic pump, $B_p$ corresponds to an actual load sensitivity for the hydraulic pump and G corresponds to a steady state control gain for the hydraulic pump.

17. The system of claim 15, wherein the controller is further configured to modify the proportional gain based on a variable compensation gain in order to generate a modified proportional gain, the variable compensation gain changing based on variations in the actual swashplate position.

18. The system of claim 17, wherein the variable compensation gain increases as the actual swashplate position increases.

19. The system of claim 11, wherein the controller is further configured to adjust the adjusted valve current command by a rate limit compensation associated with a desired rate of change for the actual swashplate position.

20. A method for controlling a hydrostatic drive unit of a work vehicle, the method comprising:
determining a reference swashplate position for a swashplate of a hydraulic pump of the hydrostatic drive unit, the reference swashplate position being associated with an unadjusted valve current command;
monitoring an actual swashplate position of the swashplate, the actual swashplate position differing from the reference swashplate position due to a loading condition of the work vehicle;
determining a proportional gain based on the difference between the actual swashplate position and the reference swashplate position;
generating an adjusted valve current command by modifying the unadjusted valve current command based on the proportional gain, the adjusted valve current command being associated with moving the swashplate to an adjusted swashplate position that differs from the reference swashplate position; and
controlling a valve of the work vehicle based on the adjusted valve current command such that the swashplate is moved to the adjusted swashplate position,
wherein the proportional gain is calculated according to the following equation:

$$k = \frac{1 - \frac{B_r}{B_p}}{G}$$

wherein, k corresponds to the proportional gain, $B_r$ corresponds to a desired load sensitivity for the hydraulic pump, $B_p$ corresponds to an actual load sensitivity for the hydraulic pump and G corresponds to a steady state control gain for the hydraulic pump.

* * * * *